United States Patent

Fitzsimons et al.

[15] 3,649,772

[45] Mar. 14, 1972

[54] LINE CARD CIRCUIT FOR A KEY TELEPHONE SYSTEM

[72] Inventors: Alan Rayment Fitzsimons, Laguna Beach; Robert John Phelps, Anaheim, both of Calif.

[73] Assignee: San/Bar Electronics Corporation, Long Beach, Calif.

[22] Filed: Jan. 19, 1970

[21] Appl. No.: 3,596

Related U.S. Application Data

[63] Continuation-in-part of Ser. No. 852,585, Aug. 25, 1969.

[52] U.S. Cl. ....................179/99

[51] Int. Cl. ....................H04m 1/00

[58] Field of Search ....................179/99, 90 K, 16.5

[56] References Cited

UNITED STATES PATENTS

| | | | |
|---|---|---|---|
| 3,436,488 | 4/1969 | Barbato et al. | 179/99 |
| 2,038,303 | 4/1936 | Mathies | 179/16.5 |
| 2,862,062 | 11/1958 | Carter | 179/99 |
| 3,420,963 | 1/1969 | Abbott et al. | 179/99 |

*Primary Examiner*—Kathleen H. Claffy
*Assistant Examiner*—David L. Stewart
*Attorney*—Jackson & Jones

[57] ABSTRACT

A line card circuit for a key telephone system is disclosed. A key telephone system includes a subscriber line comprising a pair of line conductors interconnecting a central office with one or more subscriber key sets. The line car circuit has a sensing means which is responsive to ringing signals in the line conductors to initiate local signaling as an indication of the presence of an incoming call. Means are provided to assure that the sensing means is nonresponsive to system noise transients. Means are further provided responsive to the operation of the sensing means to maintain said local signaling for a predetermined period. Additional means are provided to rapidly switch the associated line into a "hold" condition when required. The rapid switching assures that associated PBX or central office equipment will not receive a premature line release indication. Means are further provided to perform all the necessary switching and supervisory functions required by the associated line.

17 Claims, 2 Drawing Figures

PATENTED MAR 14 1972

3,649,772

SHEET 1 OF 2

INVENTORS.
ALAN RAYMENT FITZSIMONS
ROBERT JOHN PHELPS

Jackson & Jones
ATTORNEYS.

LINE CARD CIRCUIT FOR A KEY TELEPHONE SYSTEM

CROSS-REFERENCE TO RELATED APPLICATION

This application is a continuation-in-part of a patent application entitled "Line Card" having Ser. No. 852,585 filed Aug. 25, 1969 by the same inventors and assigned to the same assignee as the present invention.

BACKGROUND OF THE INVENTION

1. Field of the Invention

This invention relates to telephone systems and more particularly to improvements in communication facilities located at the subscriber's premises known generally as key telephone switching facilities.

2. Description of the Prior Art

Key telephone systems are customer controlled switching systems which permit using subscriber station sets (often referred to as key sets) for a plurality of telephone lines by allowing selective switching from one line to another. In addition, the switching system performs a plurality of control and supervisory functions necessary to allow the utilization of a plurality of telephone lines by each multiline key set.

Typically, each line controllable by a multiline key set has associated therewith a so-called line card which is generally located in a central box at a subscriber station. Each line card contains the necessary components to perform all the necessary switching and supervisory operations required by its associated line no matter how many station sets have access to the line. These functions include audibly and/or visably signaling a subscriber station in response to the detection of a ringing signal from a central office or PBX switching point; placing a line in use in a "hold" condition so that the controlling party may use his subset for another line or intercom facility without losing his call; sensing the abandonment of an incoming call and thereafter clearing the abandoned line to make it available for further use; answering an incoming call by allowing subset connection to the incoming call line; and allowing call origination from the subscriber station by effecting seizure of the selected line.

Because of the multiplicity of functions to be performed each card is generally limited to operation in relation to a single line. Since the business community utilizes a tremendous number of key telephone units and associated lines, great effort has been directed towards increasing the reliability and reducing the complexity, size and cost of such line cards. Although significant strides have been taken in improving the reliability and performance of such cards within the confines of the above indicated economic considerations, modern commercially available line cards still suffer from a variety of imperfections.

Known line cards are generally of two types. The first type utilizes four or more relays both to sense the presence of ringing signals incident to an incoming call and to perform the many required switching and holding operations. Multiple relay sensing and switching circuits, however, are generally large in size. Further, the operating and release times of the relays often limit the speed of the various required switching operations. This limitation may lead to serious system malfunctions. For example, the switching time into the "hold" mode is so long that sensitive PBX or central office equipment occasionally receive a "line release" indication causing the line to be disconnected before it can be actually placed in the "hold" mode.

To overcome these and other deficiencies of multiple relay apparatus, the telephone industry has lately turned to using transistorized sensing and switching circuits. While such transistorized units do reduce overall line card size, they have introduced problems of their own.

As is known, transistor circuits require various associated biasing and current control components for proper operation. Such requirements multiply the total number of components required thus increasing the complexity of the resultant circuit. Further, use of line connected transistors to sense the presence of ringing signals incident to an incoming call request has resulted in a significant increase in experienced "false ringing." This is caused by the highly sensitive line connected transistors interpreting line voltage transients (due to either disturbances on the line or variations in power supply voltage) as ringing signals.

This oversensitivity has required telephone companies to replace their previous inexpensive power supply units with highly sophisticated and costly well-regulated power units in an attempt to reduce power supply transients. This, of course, has not solved the problem caused by other line voltage transients.

Another defect in prior art line cards involves the inability of repair personnel to readily determine (at the line card station) which associated lines are in use. Such personnel must currently monitor each line before performing any repair work thereon or run the risk of disconnecting a call. It is, therefore, extremely desirable to provide such maintenance personnel with a ready indication of the condition of each line without requiring the cumbersome procedure of either breaking into or monitoring the lines.

SUMMARY OF THE INVENTION

Our invention comprises a novel line card circuit connected at the subscriber's location to perform all the required sensing and switching functions. Sensing means are provided to be operated by ringing signals in the line conductors. In one specific embodiment the sensing means comprises a double wound relay having a first winding operatively connected to the ring and tip leads from the PBX or central office to sense the presence of ringing current therein. The sensing relay, while responding to ringing signals, will not readily respond to line or circuit transients. Means are further provided to selectively connect the sensing means between the tip lead and ground or the ring lead and ground for "two party" operation.

Means are provided responsive to the operation of the sensing relay but electrically isolated from the line ringing signals to provide signals to all associated key set line buttons as an indication of the presence on the line of an incoming call. Circuit means are also provided to prepare a holding circuit for rapid connection across the ring and tip leads to assure that, should it subsequently be desired to place the incoming call in a hold condition, the line may be rapidly bridged to prevent loss of the call.

Further, means are provided responsive to the operation of the sensing relay to energize a "busy lamp" circuit which when switch actuated at the line card location informs maintenance personnel that the associated line is being used. Means are also provided responsive to line seizure at the subscriber location to provide the key set button with a continuous "line seized" signal.

Hold means are provided, responsive to operation of the "hold" button on the telephone key set, to rapidly loop the T & R line leads with a characteristic impedance to prevent loss of the call and insure that the line is "held" in a seized condition. Means are also provided, responsive to operation of the "hold" button on the key set to provide a "hold" signal to the key set button indicative that the line is in such a hold condition.

Upon call termination, effected by hand set replacement, the sensing relay is released and the line card circuit is placed in an idle condition making the associated line available for further use as desired.

Although the line card circuit of the present invention utilizes a sensing relay, circuit transistors and associated components, the circuit transistors are isolated from the telephone line pair. Line transients and power supply variations will not, therefore, induce "false ringing." Further, the line card circuit of the present invention is of considerably simpler design than prior configurations, significantly increasing system reliability. The line card requires fewer overall components while providing increased versatility and reliability.

DESCRIPTION OF THE PREFERRED EMBODIMENT

Figure 1:
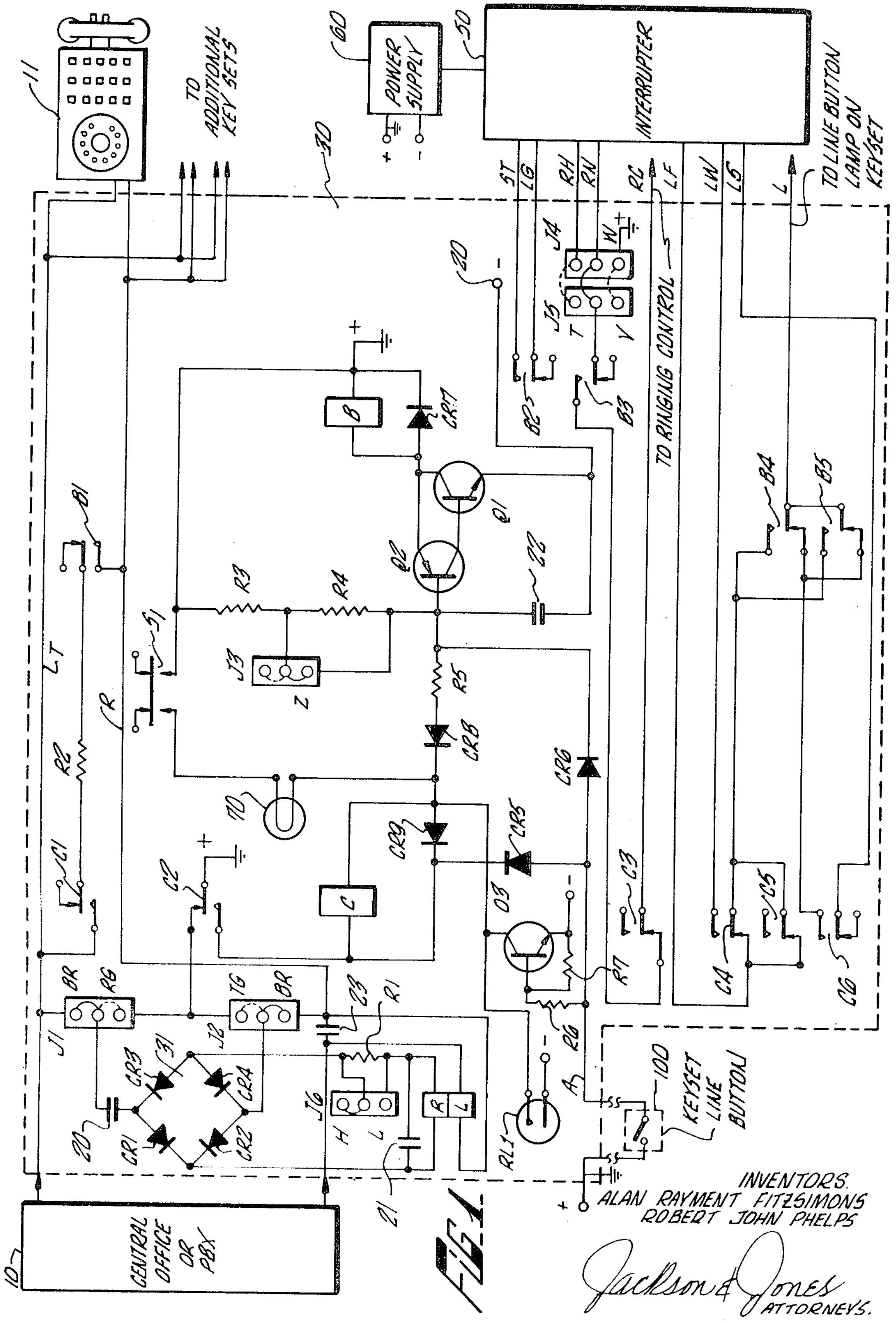
FIG. 1 is a block diagram and schematic of a first embodiment of a line card circuit constructed in accordance with the principles of the present invention.

Referring now to FIG. 1, a subscriber key set 11 is shown connected to a central office or PBX station 10 via line card circuit 30. Although FIG. 1 shows only one key set connected to the depicted central office line, it is to be understood that any desired number may be additionally connected.

The line card circuit comprises a rectifying bridge 31 of four bridge connected diodes CR1 to CR4. A capacitor 20 is connected in series with the rectifying bridge 31 to prevent DC loop current through the bridge and provide a high bridging impedance to audio signals. The bridge and capacitor combination are selectively connected across the central office tip (T) and ring (R) leads via straps J1 and J2.

Strap J1 is provided with an adjustable U-link, as shown, to enable connection of one input lead of the bridge 31 to either the tip lead (T) or to ground via the normally closed contact C2 of a relay C, as shown. The U-link of the strap J1 may be selectively connected either in the BR position for bridged ringing or in the RG position for ringing ring lead (R) to ground, depending upon whether bridged or divided ringing is desired. In a like manner, strap J2 is provided with an adjustable U-link which is connected either in the BR position for bridged ringing or the TG position for ringing tip lead (T) to ground, depending upon whether bridged or divided ringing is desired. Connection in the divided ringing position allows a single line to be used for two distinct parties having two distinct numbers. Such a "two-party" application allows subscribers to parallel their own home line with those in the office. One number may be used as an office "daytime" number which when dialed will not cause any bell ringing at the home location. The other number can be used as a "night" number to effect ringing at the home location.

An R winding of a sensing relay RL is connected across the rectifier bridge, as shown, to sense the presence of ringing current provided by station 10 to the tip and ring leads. Relay RL is preferably a double wound dry reed type sensing relay. A tank capacitor 21 is connected across the R winding of relay RL. Capacitor 21 in conjunction with resistor R1 functions as a tank circuit to prevent the relay R1 from "chattering" due to the presence of the ringing signal which periodically has a zero signal level. A strap J6 having an adjustable U-link connectable to short out resistor R1 (in the L position) is provided. With R1 shorted out the R winding of the RL relay will respond to a lower ringing voltage level.

When relay RL is operated, a contact RL1 of the relay allows application of a negative potential (from a power supply 60) to the base of a transistor Q2 via a resistor R5 and a diode CR8. This negative potential serves to discharge a capacitor 22. Capacitor 22 has been previously charged by a positive potential through resistors R3 and R4 derived from a power supply 60 and applied to ground. Transistor Q2 will therefore switch into its conduction mode. Transistor Q2 conducting will switch "on" a transistor Q1 and hence energize an associated B relay which, as shown, is connected as the collector load of transistor Q1. It is to be understood that the power supply 60 is a conventional DC source and is intended to be employed with the present line card circuit 30 in a standard manner that is well known in the art. For example, it is a long standing practice in the telephone field to have the positive terminal connected to ground. The "positive" potential is accordingly actually ground potential. The negative terminal may be typically −24 volts. Higher negative levels are used as is required.

Operation of contact RL1 of the RL relay also makes potential available to light a busy lamp 70 which is in series electrical connection with contact RL1, a testing switch $S_1$ and ground. Busy lamp 70 provides maintenance personnel with an indicator at the line card location that the associated line is being used. The condition of the line card circuit 30 may be interrogated at the line card location by simply closing switch $S_1$ and observing whether busy light 70 lights.

As above-mentioned, operation of contact RL1 results in operation of the B relay which as shown may be equipped with a plurality of contacts B1, B2, B3, B4 and B5. The function of the contacts, which are illustrated in their normal positions, are now considered. Operation of contact B2 of the B relay connects the lead ST to the line LG which starts the motor of standard interrupter 50. Suitable interrupters are well-known and need not be described in detail here. Briefly, however, they typically include a motor which drives a plurality of cams which in turn open and close various contacts. The opening and closing of the contacts provide the desired interruptions in the signals applied to the various lamp and audible ringing circuits. This results in the characteristic lamp flashing, lamp winking and audible ringing signals which indicate the status of each line at the key set location.

Contact B3 of relay B upon operating connects a preselected ringing option to the ringing control line RC to energize an audible signal generator at the subscriber subset or at a local ringing station (not shown). The ringing option is selected by positioning an adjustable "U" link interconnecting straps J5 and J4. With the "U" link in the T position, a high voltage ringing signal (RH) is applied to the ringing control line RC. In the W position a normal voltage level ringing signal (RN) is applied to line RC, while in the "V" position line RC is connected to ground and no audible ringing will occur.

Operation of contacts B4 and B5 of relay B connects the lamp flash line (LF) from the interrupter 50 to the push button lamp on the Keyset 11. Interrupter 50 provides a periodically interrupted (flashing) indication of the presence of an incoming call to the line button lamp on the key set. The double set of contacts (B4 and B5) provides contact redundancy whereby failure of one contact will not impare system operation.

It should be noted that while the circuit for initiating the local signaling is activated by operation of the RL1 relay contact it is not electrically connected to the line pair and is therefore electrically isolated from the ringing signals.

Operation of contact B1 of relay B completes a holding circuit comprising a resistor R2 by connecting R2 to the R lead. In the hold mode, the resistor R2 is connected across the R and T leads to maintain the line in a seized condition as will be hereinafter more fully described.

Relay B is maintained in an operated condition and the above operations are continued until the call is either answered or abandoned and timed out. If the call is abandoned, the ringing voltage of the incoming call ceases. The timeout charge during which time relay B remains operated is determined by the time constant of a discharge circuit comprising capacitor 22 and a pair of series connected resistors R3 and R4. A strap J3 having a U-link connectable as shown in a "Z" position may be used to short out resistor R4 to reduce the time constant of the discharge circuit and thus shorten the timeout period, if desired.

Assume now that a call is answered by a lift off of the handset and a pressing of the line push button 100 on the key set telephone instrument 11 corresponding to the incoming call line. The telephone instrument 11 loops the T and R leads in a well-known manner allowing the flow of DC current in the T-R loop. The resultant central office or PBX line circuit current will maintain the RL relay in an operated condition via its L winding which is connected as shown in series with the T-R loop. A capacitor 23 is connected in parallel with the L winding to assure that the presence of the relay winding does not degrade audio signals.

Operation of the key set line button 100 connects the positive terminal of the power supply 60, to the "A" line lead. The positive or ground potential on the "A" lead is applied to the base of transistor Q2 via diode CR6, thus switching the transistor Q2 off. The B relay is therefore released. Contacts B2 and B3 of the B relay upon release function to stop the interrupter motor and disconnect the ringing audible signal respectively. Further, holding resistor R2 is disconnected from the ring lead by the opening of contact B1.

The positive potential on line A also functions to operate relay C via circuit path that may be traced from the line button 100, through a diode CR5 and the relay C winding to the negative terminal of the power supply 60 via the closed relay contact RL1. The positive potential on line A further functions to prime a transistor Q3 to be rendered conductive to furnish an alternative hold path for relay C to the negative power terminal. The transistor Q3 will be rendered conductive by an opening of the relay contact RL1 provided that the line A is connected to the positive terminal of the power supply 60. The alternate hold path is desirable for reasons to be more fully described hereinafter.

The operation of relay C prepares the holding circuit by Q2 resistor R2 to the tip lead T via contact C1 of relay C. Contact C2 of relay C when operated disconnects the ground connection from the ringing straps J1 and J2 and the bridge 31 to avoid ground noise pickup on the line during audio and also provides an alternate holding circuit for the C relay should the positive terminal connection to the "A" lead be removed. Diode CR5 prevents the holding positive from feeding back to the A line lead. Diode CR6 prevents the negative terminal from the being coupled through RL1 contact feeding, the relay C coil and the diode CR5 to operate the transistors Q1 and -2 and relay B.

The operation of contact C3 of relay C disconnects and prevents reconnection of the audible ringing signal should the relay B be reoperated. Upon operating contacts C4 and C5 of relay C disconnect the lamp flash line (LF) from the line button lamp. Contact C6 upon operating connects a steady lamp signal line LS from the interrupter 50 to the line button lamp as an indication of the "call answered" condition. Use of contact pair C5 and C4 provides contact redundancy which assures proper circuit operation even if one contact becomes inoperable.

Operation of the hold button on the telephone key releases the key set line button 100 in a well-known manner. Release of button 100 removes the positive or ground potential from the "A" lead which rapidly turns on transistors Q1 and Q2 due to the negative potential applied through the relay RL1 contact. Relay B is therefore reoperated. Reoperation of the B relay connects resistor R2 across the T and R leads via the closed contacts C1 and B1. This is the hold condition. Connection of resistor R2 to the T and R leads holds the RL relay operated via the central office or PBX line current by providing a substitute electrical path for the line current.

Operation of the B3 contact serves to restart the interrupter motor. Operation of contacts B4 and B5 connects the lamp wink (LW) lead from the interrupter to the line button lamp line L to provide a wink (hold) indication signal to the line button light. It should be noted, as previously mentioned, that the audible ringing line RL is not reconnected because the operation of contact C3 disconnects the RC line.

In the event an incoming call is placed on hold and the caller abandons that call, the central office or PBX will give a line disconnect condition characterized by an absence of T-R loop current. The absence of T-R loop current causes the RL relay to be released. Release of the RL relay releases the B and C relays thus restoring the line card circuit to an idle condition.

In the talk condition the circuit is under control of either the transistor Q3, when conductive, or the RL relay which relay will normally remain operated since the L winding is in series with the telephone and the T-R loop. Receiver replacement and/or line button restoration will immediately release relay RL and will restore transistor Q3 to its nonconductive state placing the circuit 30 in an idle condition.

When originating a call from the Keyset 11, line seizure is effected by pressing the key set line button 100 with the receiver off hook. This serves to apply a positive potential to the A lead as previously discussed. The loop established tip to ring via the telephone instrument operates the RL relay via the L line connected winding. The RL1 contact operating will operate the C relay providing the associated line button lamp with a "line seized" steady light indication. The call is now dependent upon receiver replacement at call termination.

As above described, it is necessary for the C relay to be operated to assure that a steady light indication is provided to the associated line button lamp on the key set. This steady light signal indicates to the line user that he is operating upon a "seized" line. In the circuit as thus far described, there is an instance when the C relay could become inactivated even when the associated line button 100 is activated. This occurs when station 10 is a facility such as a manual PBX facility. With such a facility a call is typically initiated when the caller depresses a key set line button, picks up his handset, and reaches a PBX operator whereupon he designates his call request. The operator customarily thereafter places the callers line in a "PBX hold" condition while the request is executed.

This "PBX hold" condition may totally disconnect the subscriber T-R line pair from the central office line side. The disconnection removes the source of T-R line current which is required to operate the RL relay. The RL relay thus releases, causing the release of the C relay. Release of the C relay disrupts the light signal to the subscriber line button 100 and thereby gives the caller the impression that he has lost the operator. Depending upon the conscientiousness of the operator, this condition might last for several minutes.

To insure that the C relay remains operated should the RL relay inadvertently release, a transistor Q3 is connected to shunt the RL1 contact to provide a holdover for the C relay. The base of transistor Q3 is connected via resistor R6 to the positive potential on the A lead. A resistor R7 is connected between the base and emitter electrodes. As shown, the collector terminal of transistor Q3 is connected to the RL1 contact and also to the positive terminal of the supply 60 via the relay coil C. With line button 100 depressed, current will be permitted to flow from the negative terminal through the resisters R6 and R7 and the line button 100 back to the positive terminal of the supply 60 to properly bias the base of transistor Q3 with respect to the emitter thereof. Since the RL1 contact is open, the collector lead is also properly biased by being maintained at ground potential. Transistor Q3 will therefore conduct and provide an alternate current path to hold the C relay. The line button light will therefore remain lit until the PBX operator reconnects the subscriber lineside to the central office power.

Figure 2:
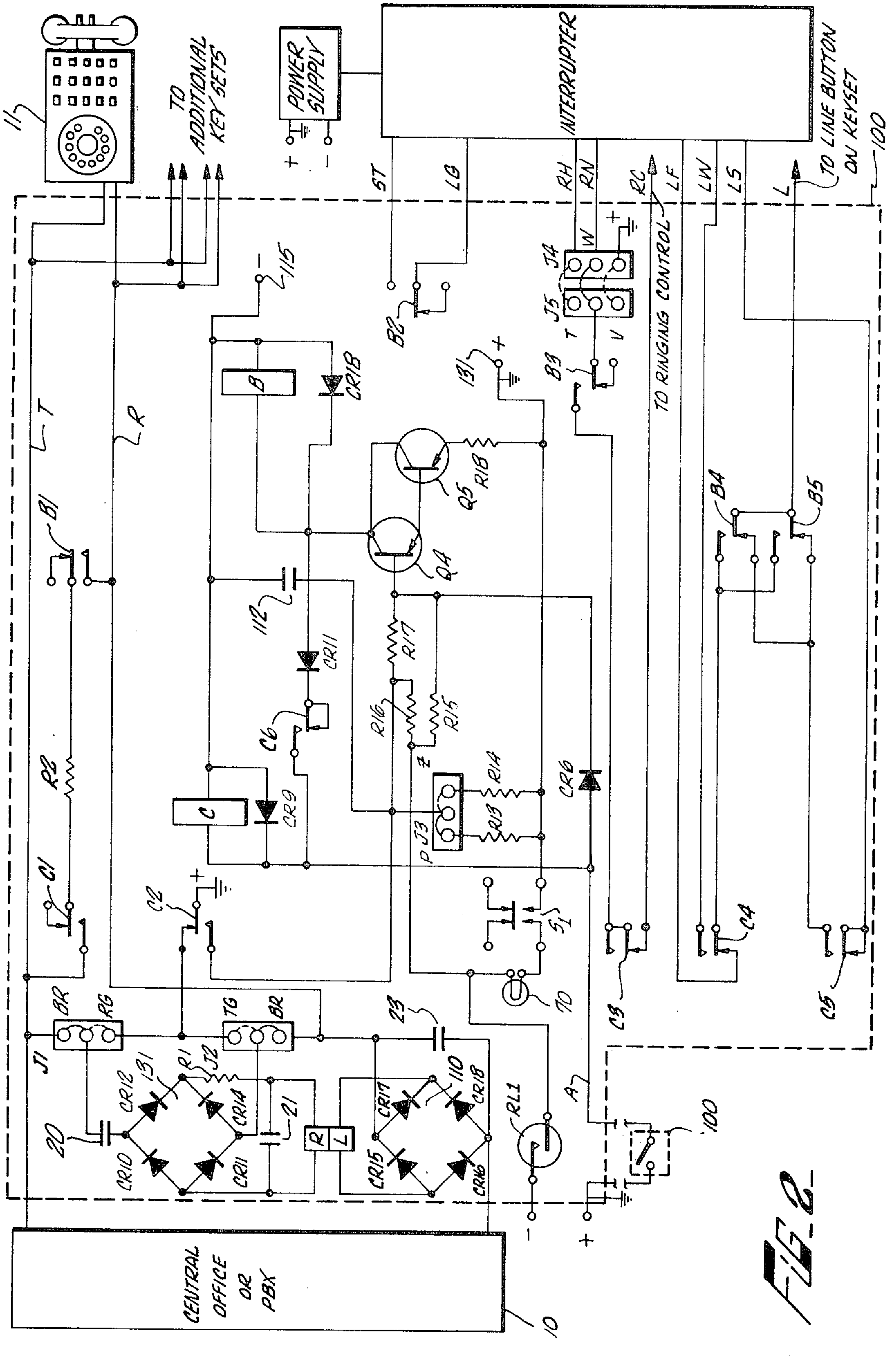
FIG. 2 is a block diagram and schematic of a second embodiment of a line card circuit constructed in accordance with the principles of the present invention.

Referring now to FIG. 2, there is shown a second embodiment of a line card circuit 100 interconnecting a central office or PBX station 10 and one or more subscriber key sets 11.

The operation of the line card circuit of FIG. 2 is similar to that of FIG. 1 and need not be described in detail. However, there exist several modifications, hereinafter described, in the line card circuit of FIG. 2.

The line card circuit of FIG. 2 includes an additional rectifying bridge 110 of four bridge connected diodes CR15-CR18. Bridge 110 is connected, as shown, in series with the T-R loop. The L coil of the RL relay is connected across the bridge and is therefore, as in FIG. 2, operated by current in the T-R loop.

It has been found that in the "hang-up" condition, line transients of considerable magnitude are sometimes present in the line. These transients could on occasion be sufficient to operate the RL relay and thus provide a spurious "ringing-in" condition when going into the "hang-up" mode. The additional bridge 110 in FIG. 2 provides a DC current to the L winding which results in the establishment of a field in the L winding opposing that established by bridge 131 in the R winding during "hang-up." The opposing fields assure that the RL1 contact will not be spuriously operated by line transients.

As in the circuit of FIG. 1, the R winding of sensing relay RL is connected across a rectifying bridge 131 to sense the presence of ringing current provided by central office or PBX 10 to the tip and ring leads. The presence of ringing current operates the RL relay via the R winding. When relay RL is operated, contact RL1 of the relay applies a negative potential to the base of transistor Q4 via resistor R15. This negative potential serves to discharge a capacitor 112. Capacitor 112 has been previously charged by a negative potential at terminal 115 obtained from power supply 60. The negative potential appearing at the base of transistor Q4 causes transistor Q4 to switch into its conducting mode. Transistor Q4 conducting will switch on transistor Q5. The B relay which, as shown, is connected as the transistor collector load, will therefore be operated.

The closing of the various contacts of the B relay will result in various signalling, as already described in connection with the embodiment of FIG. 1.

If the call is abandoned, the ringing voltage of the incoming call ceases, thus releasing the RL1 contact. The timeout charge during which time relay B remains operated is determined by the time constant of a discharge circuit comprising capacitor 112 and one of a pair of alternately connected series resistors R13 or R14. A strap J3, having a U-link connectable as shown in either a "P" or a "Z" position, is used to selectively connect either resistor R13 or R14 to the timeout circuit, depending upon which timeout charge is desired.

The use of alternate timeout resistors in the circuit of FIG. 2, as opposed to adding or subtracting an additional resistor in series with the timeout circuit, as in FIG. 1, is advantageous since the uncertainties caused by adding two resistors, each of which have separate tolerances, is obviated.

The answering of a call by the lift-off of the handset and the pressing of the associated line button 100 on the key set telephone instrument 11 loops the T-R line leads. The resultant central office or PBX line current will operate the RL relay via series connected bridge 110 which is connected to the L winding. Operation of the line button 100 applies a positive potential to the A lead and thereby operates the C relay which is connected directly to the negative battery at terminal 115. The positive potential on the A lead also switches off transistors Q1 and Q2 causing release of the B relay.

Since in the embodiment of FIG. 2 there is provided a direct hold path for the C relay when the line button 100 is operated, the need for the transistor Q3 of FIG. 1 is obviated, thus simplifying the circuitry.

Operation of the hold button on the telephone key set 11 removes the positive on the A lead from the base of the transistor Q4. Relay B will be rapidly reoperated because of the negative potential applied via the RL1 contact through resistor R15 to the base of transistor Q4. During this time an alternate hold path for the C relay is provided via the positive potential at terminal 131 through transistors Q4–Q5 and an operated contact C6 of relay C. This alternate hold path assures that, while going into the hold condition, the C relay remains operated even if the RL relay is momentarily spuriously released. As in the embodiment of FIG. 1, the contacts B1 and C1, when closed, loop the ring and tip leads with a characteristic impedance R2 to maintain the RL relay operated via its L winding and provide the "hold" condition.

There has, therefore, been described line card circuits of relatively simple design. The line cards are capable of performing all the required switching and supervisory functions while providing significantly increased reliability.

What is claimed is:

1. A line card circuit for a telephone system which includes a subscriber line formed by a pair of line conductors interconnecting a central office with a subscriber station set, the subscriber set having means for looping the line conductors to provide a current loop, said circuit comprising:

sensing means responsive to ringing signals in said line conductors to be operated thereby, said sensing means including:

a first rectifier bridge selectively connected between the conductors of said line conductor pair or between one of said conductors and ground, said first rectifier bridge having first and second output terminals providing rectified outputs responsive to receipt by said first rectifier bridge of ringing signals, a double wound relay having first and second windings, said first winding connected across said first and second output terminals of said first rectifier bridge, said second winding connected in series electrical relationship with said current loop, said second winding being responsive to current in said current loop, and a second rectifier bridge connected in series with said current loop, said second rectifier bridge having third and fourth output terminals providing rectified outputs responsive to current in said current loop, said second winding connected to said third and fourth output terminals;

means responsive to the operation of said sensing means and electrically isolated from said ringing signals for initiating local signalling; and means responsive to the operation of said sensing means for maintaining said local signalling for a preselected period.

2. The circuit of claim 1 wherein said first and second bridges provide currents to said first and second windings which establish opposing fields in said windings, whereby said relay will not be spuriously operated by transient signals.

3. The circuit of claim 1 wherein said local signalling maintaining means comprises:

a third capacitor adapted to provide a local signalling maintaining signal when in a discharged condition;

means for discharging said capacitor responsive to the operation of said sensing means; and means for charging said capacitor responsive to the noncontinued operation of said sensing means resulting from a cessation of said ringing signals.

4. The circuit of claim 3 wherein said charging means comprises:

a second source of potential; and at least one resistor in series with said capacitor and said second source of potential.

5. A telephone line circuit for use with telephone systems characterized by at least one key telephone unit and a pair of line conductors adapted to be interconnected by operation of said key telephone unit, said telephone line circuit comprising:

first sensing means for detecting ringing signals applied to said line conductors, said first sensing means including a first rectifier for providing first direct current signals in response to said ringing signals, said first direct current signals effecting ringing at said key telephone unit;

second sensing means for detecting the flow of line current in said line conductors, said second sensing means including a second rectifier for providing second direct current signals in response to said line current; and means for preventing false ringing at said key telephone unit when said first and second direct current signals occur concurrently.

6. The telephone line circuit defined by claim 5 further comprising:

means including a first relay responsive to detection of said first direct current signals for enabling ringing at said key telephone unit; and means including said first relay for connecting a holding impedance between said pair of line conductors.

7. The telephone line circuit defined by claim 6 wherein said means for preventing false ringing includes a second relay having first and second coils, said first coil being connected to receive said first direct current signals from said first rectifier, said second coil being connected to receive said second direct current signals from said second rectifier, said first and second coils being adapted to have fields created by the flow of current therein directed in opposing directions.

8. The telephone line circuit defined by claim 5, said means for preventing false ringing including a relay having first and second coils, said first coil being connected to receive said first direct current signals from said first rectifier, said second coil being connected to receive said second direct current signals from said second rectifier, said first and second coils being adapted to have fields created by the flow of current therein directed in opposing directions.

9. A telephone line circuit for use with telephone systems characterized by at least one key telephone unit and a pair of line conductors adapted to be interconnected by operation of said key telephone unit, said telephone line circuit comprising:

first sensing means for detecting ringing signals applied to said line conductors, said first sensing means including a first rectifier for providing first direct current signals in response to said ringing signals;

second sensing means for detecting the flow of line current in said line conductors, said second sensing means including a second rectifier for providing second direct current signals in response to said line current; and wherein said first sensing means further includes a first coil of a relay having first and second coils, said first coil being connected to receive said first direct current signals from said first rectifier, said second sensing means including said second coil, said second coil being connected to receive said second direct current signals from said second rectifier, said first and second coils being adapted to have fields created by the flow of current therein directed in opposing directions.

10. A telephone line circuit for use with telephone systems including at least one key telephone unit and a pair of line conductors to which ringing signals and line current are applied and which are adapted to be interconnected by operation of said key telephone unit, said telephone line circuit comprising:

a first full wave rectifier having a pair of input terminals and a pair of output terminals, said input terminal being adapted to be connected between said line conductors, said first rectifier providing direct current signals at said output terminals in response to said ringing signals;

a second full wave rectifier having a pair of input terminals and a pair of output terminals of which the input terminals are both connected to one of said line conductors, said second rectifier providing direct current signals in response to said line current; and a first relay having first and second coils and a contact responsive to energization of said first or second coils, said first coil being connected to be energized by direct current signals from said first rectifier, said second coil connected to be energized by direct current signals from said second rectifier.

11. The apparatus defined by claim 10 further including:

a ringing circuit including a second relay for selectively enabling ringing at said key telephone unit in response to operation of said contact; and a holding circuit including said second relay for connecting an impedance between said line conductors to have said line conductors maintained in a hold position.

12. The apparatus defined by claim 11 further including:

means having a third relay for controlling the presence of visual indications at said key telephone unit when in operation; and means for maintaining said third relay in an energized condition when said key telephone unit is in operation.

13. The apparatus defined by claim 10 wherein said line current is direct current, said apparatus further including means for rendering said first full wave rectifier immune to the presence of said line current in said line conductors.

14. The apparatus defined by claim 10 wherein said ringing signals are in the form of alternating current, said apparatus further including means for rendering said second full wave rectifier immune to the application of ringing signals to said line conductors.

15. The apparatus defined by claim 14 wherein said line current is direct current, said apparatus further including means for rendering said first full wave rectifier immune to the presence of line current in said line conductors.

16. The apparatus defined by claim 15 further including:

a ringing circuit including a second relay for selectively enabling ringing at said key telephone unit in response to operation of said contact; and a holding circuit including said second relay for connecting an impedance between said line conductors to have said line conductors maintained in a hold position.

17. The apparatus defined by claim 16 further including:

means having a third relay for controlling the presence of visual indications at said key telephone unit when in operation; and means for maintaining said third relay in an energized condition when said key telephone unit is in operation.

* * * * *

UNITED STATES PATENT OFFICE

CERTIFICATE OF CORRECTION

Patent No. 3,649,772 Dated March 14, 1972

Inventor(s) Alan R. FitzSimons and Robert J. Phelps

It is certified that error appears in the above-identified patent and that said Letters Patent are hereby corrected as shown below:

In the Abstract, line 4, "car" should be "card";

Column 5, line 20, insert after "circuit by" ---connecting---;

line 20, delete "Q2";

Column 5, line 29, delete "feeding".

Signed and sealed this 15th day of August 1972.

(SEAL)
Attest:

EDWARD M.FLETCHER,JR.
Attesting Officer

ROBERT GOTTSCHALK
Commissioner of Patents